United States Patent Office 3,734,938
Patented May 22, 1973

---

3,734,938
NOVEL PROCESS FOR 3β,17β-DIHYDROXY-5-ANDROSTENE-17α-PROPYNOIC ACID
Francisc Petru Hodosan, Nicolae Serban, Arpad Balogh, Ioan Jude, Ottmar Carol Mantsch, and Nicolae Stefan Bodor, Cluj, Rumania, assignors to Institutul de Chimie Cluj, Cluj, Rumania
No Drawing. Filed Aug. 2, 1971, Ser. No. 168,442
Claims priority, application Rumania, Aug. 5, 1970, 64,146/70
Int. Cl. C07c *169/24*
U.S. Cl. 260—397.1
2 Claims

ABSTRACT OF THE DISCLOSURE

A process for preparing 3β,17β-dihydroxy-5-androstene-17α-propynoic acid in a one-step synthesis characterized in that 3β-hydroxy-5-androsten-17-one is condensed with propiolic acid in alcohol solution in the presence of an alkaline hydroxide. The condensation product is then isolated as the ammonium salt. The yield is about 70%.

---

This invention relates to a novel process for preparing 3β,17β-dihydroxy-5-androstene-17α-propynoic acid. This is of value as intermediate in the synthesis of antialdosterone diuretic agents.

The prior art process of preparing 3β,17β-dihydroxy-5-androstene-17α-propynoic acid is to contact 3β-hydroxy-5-androsten-17-ones with acetylene in the presence of potassium tert.-butoxide, to treat the 17α-propynyl-3β,17β-dihydroxy-5-androstene formed with ethylmagnesium bromide, and to carbonate the obtained Grignard compound with gaseous or solid carbon dioxide; the final compound can be purified through its triethylammonium salt.

This process is inconvenient in that it requires multiple manipulations, the use of inflammable solvents, expensive reagents, and complicated apparatus. Especially the second step is difficult to carry out, the actual yield being lower than that reported.

The process to which this invention relates is distinguished from the prior art in the following particulars:

(1) It carrier out in one step, namely contacting 3β-hydroxy-5-androsten-17-one with propiolic acid in the presence of potassium hydroxide in alcoholic solution, at a temperature of about 25° C.
(2) The final product is isolated as the ammonium salt.
(3) It affords high yields.
(4) It makes use of relatively inexpensive reagents and solvent.
(5) It requires a very simple apparatus and a minimum of manipulative steps.

The invention is illustrated by the following example:
In a 750 ml. flask equipped with mechanical stirrer, a thermometer, and a dropping funnel, are placed 100 g. of potassium hydroxide (pellets) and 100 ml. of ethanol. The mixture is stirred vigorously for 15 minutes at room temperature. The flask is then cooled in an ice-bath and when the internal temperature has dropped to 10° C., 10 ml. of propiolic acid ($n_D$ 1.428–1.434) are added dropwise with vigorous stirring; the temperature is maintained at 10° C. Stirring is now stopped and 25 g. of powdered 3β-hydroxy-5-androsten-17-one are added at once. The stirrer is started and the temperature is allowed to rise to 25° C. After 1 hour of stirring a solution of 20 ml. of propiolic acid in 50 ml. of ethanol is added dropwise over a period of 3 hours. When the addition is complete the mixture is stirred for additional sixty minutes. During the entire reaction period the temperature should be maintained at about 25° C. The reaction mixture is then poured with stirring into 2 litres cold (about 10° C.) hydrochloric acid 1 M. The precipitate formed is filtered, pressed, and dried at room temperature. The dried substance is then refluxed with 1000 ml. of acetone and filtered. On the filter there remains a small quantity of potassium chloride. Gaseous ammonia is bubbled through the cold acetone solution until the separation of the ammonium salt of the reaction product is complete. The mixture is refluxed for 10 minutes and cooled to room temperature. The precipitate is filtered and placed in a flask equipped with a condenser and a mechanical stirrer. The substance is refluxed with 300 ml. of acetone under vigorous stirring for 15 minutes. After cooling the precipitate is filtered, dried at room temperature, and dissolved in a mixture of 380 ml. of acetone, 100 ml. of water and 7 ml. of conc. hydrochloric acid. Acetone is then distilled off under reduced pressure. The precipitated reaction product is filtered, washed with water until free of chlorine, and dried at room temperature. The substance thus obtained can be used without purification in the synthesis of antialdosterone diuretic agents. Yield: 22 g. If necessarry, an analytically-pure sample can be obtained by recrystallization from aqueous methanol. M.P. 232–234° C. $[\alpha]_D$ —145° (in dioxane).

What is claimed is:
1. A process for preparing 3β,17β-dihydroxy-5-androstene-17α-propynoic acid in which 3β-hydroxy-5-androsten-17-one is reacted with propiolic acid in the presence of potassium hydroxide at a temperature of about 25° C.
2. A process for preparing 3β,17β-dihydroxy-5-androstene-17α-propynoic acid according to claim 1, in which the reaction product is isolated from unreacted ketone in the form of the ammonium salt of the reaction product.

References Cited
UNITED STATES PATENTS
3,318,917 5/1967 Benn _____ 260—397.1
3,417,110 12/1968 Wendt et al. _____ 260—397.1
3,474,115 10/1969 Buzby et al. _____ 260—397.1

HENRY A. FRENCH, Primary Examiner